(12) United States Patent
Wang et al.

(10) Patent No.: US 11,922,679 B2
(45) Date of Patent: Mar. 5, 2024

(54) AUTOMATIC SEISMIC FACIES IDENTIFICATION METHOD BASED ON COMBINATION OF SELF-ATTENTION MECHANISM AND U-SHAPE NETWORK ARCHITECTURE

(71) Applicant: Xi'an Jiaotong University, Xi'an (CN)

(72) Inventors: Zhiguo Wang, Xi'an (CN); Yumin Chen, Xi'an (CN); Yang Yang, Xi'an (CN); Zhaoqi Gao, Xi'an (CN); Zhen Li, Xi'an (CN); Qiannan Wang, Xi'an (CN); Jinghuai Gao, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 0 days.

(21) Appl. No.: 18/321,632

(22) Filed: May 22, 2023

(65) Prior Publication Data
US 2023/0306725 A1    Sep. 28, 2023

Related U.S. Application Data

(63) Continuation of application No. PCT/CN2022/108319, filed on Jul. 27, 2022.

(30) Foreign Application Priority Data

Jun. 30, 2022    (CN) .......................... 202210759364.2

(51) Int. Cl.
*G06V 10/778*    (2022.01)
*G01V 1/28*    (2006.01)
(Continued)

(52) U.S. Cl.
CPC ............ *G06V 10/778* (2022.01); *G01V 1/282* (2013.01); *G01V 1/307* (2013.01); *G01V 1/325* (2013.01);
(Continued)

(58) Field of Classification Search
None
See application file for complete search history.

(56) References Cited

U.S. PATENT DOCUMENTS

| 2021/0063594 | A1  | 3/2021  | Wang |
| 2021/0247531 | A1  | 8/2021  | Kim et al. |
| 2023/0325974 | A1* | 10/2023 | Nasrollahi ............. G06T 5/002 382/100 |

FOREIGN PATENT DOCUMENTS

| CN | 110516740 A | 11/2019 |
| CN | 111626355 A | 9/2020 |

(Continued)

OTHER PUBLICATIONS

Petrov, S. et al., "Shape carving methods of geologic body interpretation from seismic data based on deep learning," Energies vol. 15 (Jan. 31, 2022) 23 pp. (Year: 2022).*

(Continued)

*Primary Examiner* — Brian M Smith

(57) ABSTRACT

An automatic seismic facies identification method based on combination of Self-Attention mechanism and U-shape network architecture, including: obtaining and preprocessing post-stack seismic data to construct a sample training and validation dataset; building an encoder through an overlapped patch merging module with down-sampling function and a self-attention transformer module with global modeling function; building a decoder through a patch expanding module with linear upsampling function, the self-attention transformer module, and a skip connection module with multilayer feature fusion function; building a seismic facies identification model using the encoder, the decoder, and a Hypercolumn module, where the seismic facies identification model includes a Hypercolumns-U-Segformer (HUSeg); and building a hybrid loss function; iteratively training the seismic facies identification model with a train- (Continued)

ing and validation set; and inputting test data into a trained identification model to obtain seismic facies corresponding to the test data.

7 Claims, 12 Drawing Sheets

(51) Int. Cl.
*G01V 1/30* (2006.01)
*G01V 1/32* (2006.01)
*G06N 3/0455* (2023.01)
*G06N 3/084* (2023.01)
*G06V 10/20* (2022.01)
*G06V 10/764* (2022.01)
*G06V 10/77* (2022.01)
*G06V 10/82* (2022.01)

(52) U.S. Cl.
CPC ........... *G06N 3/0455* (2023.01); *G06N 3/084* (2013.01); *G06V 10/20* (2022.01); *G06V 10/764* (2022.01); *G06V 10/7715* (2022.01); *G06V 10/82* (2022.01)

(56) References Cited

FOREIGN PATENT DOCUMENTS

| CN | 112711072 A | 4/2021 |
|---|---|---|
| CN | 112731522 A | 4/2021 |
| CN | 113296152 A | 8/2021 |
| CN | 114660656 A | 6/2022 |

OTHER PUBLICATIONS

Lin, L. et al., "Automatic geologic fault identification from seismic data using 2.5D channel attention U-net," Geophysics vol. 97, No. 4 (Apr. 7, 2022) (Year: 2022).*

Li, S. et al., "Automatic fault delineation in 3-D seismic images with deep learning: data augmentation or ensemble learning?" IEEE Trans. on Geoscience and Remote Sensing, vol. 60 (Feb. 9, 2022) 14 pp. (Year: 2022).*

Oktay, O. et al., "Attention U-net: learning where to look for the pancreas," downloaded from <arxiv.org/abs/1804.03999> (May 20, 2018) 10 pp. (Year: 2018).*

Fu, J. et al., "Dual attention network for scene segmentation," downloaded from <arxiv.org/abs/1809.02983> (Apr. 21, 2019) 10 pp. (Year: 2019).*

* cited by examiner

AUTOMATIC SEISMIC FACIES IDENTIFICATION METHOD BASED ON COMBINATION OF SELF-ATTENTION MECHANISM AND U-SHAPE NETWORK ARCHITECTURE

CROSS-REFERENCE TO RELATED APPLICATIONS

This application is a continuation of International Patent Application No. PCT/CN2022/108319, filed on Jul. 27, 2022, which claims the benefit of priority from Chinese Patent Application No. 202210759364.2, filed on Jun. 30, 2022. The content of the aforementioned application, including any intervening amendments thereto, is incorporated herein by reference in its entirety.

TECHNICAL FIELD

This application relates to seismic exploration, particularly to an automatic seismic facies identification method based on combination of self-attention mechanism and U-shape network architecture, and more particularly to a seismic image semantic segmentation method combining Segformer self-attention segmentation network, U-shape network architecture, and Hypercolumn semantic segmentation, which can be applied to the automatic seismic facies identification and classification of seismic data.

BACKGROUND

With the increasing demand for oil and gas and the rapid development of artificial intelligence (AI), the intelligence and automation level of the oil-gas exploration technology has been continuously enhanced. At present, the oil-gas exploration is mainly dependent on the seismic exploration, in which the post-stack seismic data is collected through artificial seismic wave reflection, and the information of underground structure, lithology, and oil-gas potential is analyzed through multidisciplinary knowledge mining, thereby locating the distribution of underground petroleum reservoirs. Traditionally, the seismic facies classification is performed by manual interpretation or by semi-automatic feature extraction and seismic facies segmentation using some mathematical strategies. However, the manual interpretation is highly subjective and labor-consuming, and the semi-automatic methods are less accurate and time-effective, and thus fail to accurately locate the oil-gas reservoirs under complex underground structure and sedimentation conditions. Therefore, how to enable the efficient automatic identification of seismic facies with the help of computer resources has become a problem in the art that urgently needs to be solved.

In order to improve the automatic seismic facies identification, considerable attempt has been made to investigate the seismic facies classification based on deep learning, in which a nonlinear mapping from seismic data to seismic facies labels is learned in an end-to-end manner based on the existing labeled seismic data and applied to new seismic data for seismic facies classification. This method can realize the end-to-end seismic facies classification with less labor consumption and improve the interpretation effect. Dramsch and Lüthje (2018) migrated the visual geometry group-16 (VGG16) network pre-trained by ImageNet to the manually-labeled seismic data, and identified the seismic facies in the center of a sliding window by means of a sliding window algorithm, thereby realizing the automatic seismic facies classification. Zhao (2018) employed a convolutional neural network (CNN) using encoder-decoder architectures for the seismic facies classification. Di et al. (2018) labeled 4 inline sections and adopted a U-Net-like network for automatic seismic facies identification. Although these deep learning-based seismic facies identification methods all have an improved identification accuracy, these methods still have the following disadvantages, and thus fail to reach the efficient and accurate seismic facies interpretation:

(1) the seismic facies identification task is treated as a single-region classification problem rather than a pixel-level semantic segmentation problem, resulting in cumbersome computation involving a lot of repeated computation; and (2) the above methods are implemented based on windows, and the block of pixel points within the window is used as input to predict the type of seismic facies at a single point in the center (only involving local features), failing to achieve the global prediction.

SUMMARY

In view of the deficiencies in the prior art, this application provides an automatic seismic facies identification method based on combination of Self-Attention mechanism and U-shape network architecture, in which an encoding-decoding U-shape architecture is introduced based on the self-attention-based semantic segmentation network; the semantic segmentation network is used as an encoder module, and a patch expanding module based on the fully-connected (FC) layer for upsampling is introduced in the decoder; and the feature fusion is performed by Hypercolumn, thereby enabling the global attention-based seismic facies segmentation involving lower calculation amount and multi-scale feature extraction.

In a first aspect, this application provides an automatic seismic facies identification method based on combination of Self-Attention mechanism and U-shape network architecture, including:

(a) obtaining and preprocessing post-stack seismic data to construct a sample training and validation dataset;

(b) building an encoder by using an overlapped patch merging module with a down-sampling function and a self-attention transformer module capable of performing global modeling;

(c) building a decoder by using a patch expanding module with linear up-sampling function, the self-attention transformer module, and a skip connection module capable of performing multi-scale feature fusion;

(d) building a seismic facies identification model by using the encoder, the decoder, and a Hypercolumn module, wherein the seismic facies identification model includes a Hypercolumns-U-Segformer (HUSeg); and (e) building a hybrid loss function; iteratively training the seismic facies identification model with a training and validation set in the sample training and validation dataset; and inputting test data into a trained seismic facies identification model to obtain seismic facies corresponding to the test data.

In an embodiment, the step of "obtaining and preprocessing post-stack seismic data to construct a sample training and validation dataset" includes:

(a1) collecting and preprocessing original seismic data to obtain the post-stack seismic data; and normalizing an amplitude of the post-stack seismic data to [0, 1];

(a2) equally dividing the post-stack seismic data into N section blocks along a crossline direction, wherein each of the N section blocks consists of a first sub-block and a second sub-block; the first sub-block is configured as a training set, and the second sub-block is configured as a validation set; N is a positive integer greater than 2; and the number of the first sub-block is not less than the number of the second sub-block;

(a3) adjusting a size of a seismic section image to a multiple of 16 by using a linear interpolation method; and (a4) subjecting the seismic section image to data augmentation by right-and-left flipping and Gaussian noise transformation.

In an embodiment, the step of "building an encoder by using an overlapped patch merging module and a self-attention transformer module" includes:

for a seismic section image $x \in \mathbb{R}^{H \times W}$ with an input height of H and an input width of W, building an encoder composite function $f_e = f_e^4 \circ f_e^3 \circ f_e^2 \circ f_e^1$ to satisfy $$f_e(x) \in \mathbb{R}^{\frac{H}{16} \times \frac{W}{16} \times C_4};$$

and
for a feature map $$x^{(i-1)} \in \mathbb{R}^{\frac{H}{2^{i-1}} \times \frac{W}{2^{i-1}} \times C_{i-1}},$$

constructing a first subfunction $$f_e^i(x^{(i-1)}) \in \mathbb{R}^{\frac{H}{2^i} \times \frac{W}{2^i} \times C_i};$$

wherein $C_i$ is the number of channels of a feature map output by an i-th subfunction of the encoder; the first subfunction $f_e^i$ consists of the overlapped patch merging module and the self-attention transformer module, wherein the number of the overlapped patch merging module is one, and the number of the self-attention transformer module is two; the number of the first subfunction $f_e^i$ is four; four first subfunctions $f_e^i$ constitute four consecutive stages of the encoder; the overlapped patch merging module is implemented by a convolutional layer with a stride less than a kernel size; the self-attention transformer module includes a self-attention submodule and a feedforward neural network (FNN) submodule; and calculation formulas of the self-attention submodule and the FNN submodule are respectively expressed as:

$$sAtt(x) = MHSA(LN(x)) + x \quad (1); \text{ and}$$

$$FFN(x) = L_2(cv(L_1(LN(x)))) + x \quad (2);$$

wherein LN is a layer normalization function; MHSA is a multi-head self-attention calculation function; $L_1$ and $L_2$ are two fully-connected layer functions; and cv is a convolutional layer function.

In an embodiment, the step of "building a decoder by using a patch expanding module, the self-attention transformer module, and a skip connection module" includes:
building a decoder function $f_d$ to satisfy $f_d(x^{(1)}, x^{(2)}, x^{(3)}, x^{(4)}) \in \mathbb{R}^{H \times W}$; wherein the decoder function $f_d$ includes four second subfunctions $f_d^i$; the four second subfunctions $f_d^i$ constitute four stages of the decoder;

for an encoding feature map and a decoding feature map $$x^{(i)} \in \mathbb{R}^{\frac{H}{2^i} \times \frac{W}{2^i} \times C_i}$$

and a decoding feature map $$d^{(i)} \in \mathbb{R}^{\frac{H}{2^i} \times \frac{W}{2^i} \times C_i},$$

obtaining $$d^{(i-1)} = f_d^i(concat(x^{(i-1)}, d^{(i)})) \in \mathbb{R}^{\frac{H}{2^{i-1}} \times \frac{W}{2^{i-1}} \times C_{i-1}};$$

wherein $i = \{2,3,4\}$; $d^{(4)} = x^{(4)}$; concat(•) represents a tensor concatenation operation along a channel dimension; and a feature map of a last stage of the decoder is expressed as $d^{(0)} = f_d^1([d^{(1)}]) \in \mathbb{R}^{H \times W \times C}$;

each of the four second subfunctions $f_d^i$ consists of the patch expanding module and the self-attention transformer module, wherein the number of the self-attention transformer module is two; when an input feature map is x, a calculation formula of the patch expanding module is expressed as:

$$x = \text{Linear}[C, 2C](x); \text{ and} \quad (3)$$

$$x = \text{Reshape}\left[H * W \times 2C \to 2H * 2W \times \frac{C}{2}\right](x); \quad (4)$$

wherein Linear represents a fully-connected layer; and Reshape represents a dimension reshaping operation; and connecting stages of the encoder correspondingly to stages of the decoder through the skip connection module to enable the decoder to receive features from corresponding stages of the encoder for fusion.

In an embodiment, the step of "building a seismic facies identification model by using the encoder, the decoder, and a Hypercolumn module" includes:

introducing a Hypercolumn structure to fuse output feature maps $\{d^{(i)}\}_{i=0}^4$ of the four stages of the decoder to obtain a fused feature map; and performing pixel-level seismic facies classification on the fused feature map through the following formulas:

$$\hat{d}^{(i)} = \text{Linear}[C_i, C](d^{(i)}) \quad (5);$$

$$\hat{d}^{(i)} = \text{Upsample}[2^i \times](\hat{d}^{(i)}) \quad (6);$$

$$d_f = \text{Linear}[5C, C](\text{Concat}(\hat{d}^{(i)})) \quad (7); \text{ and}$$

$$M = \text{Linear}[C, N_C](d_f) \quad (8);$$

wherein Upsample $[2^i x]$ represents a bilinear interpolation for $2^i \times$ upsampling; concat(•) represents a concatenation operation along the channel dimension; Linear $[C, N_C]$ is a linear mapping from a dimension C to a dimension $N_C$; $N_C$ is the number of seismic facies types; the encoder and the decoder together form the U-shape network architecture; the encoder is located at one side of the U-shape network architecture, and the decoder is located at the other side of the U-shape network architecture; and features of each stage of the decoder are fused by the Hypercolumn structure, and the fully connected layer is configured to transform the channel dimension to the number of seismic facies types for seismic facies classification.

In an embodiment, step (e) includes:

training the seismic facies identification model by using a hybrid loss of a cross-entropy loss function and Dice Loss, wherein a calculation formula of the hybrid loss is expressed as:

$$\text{Loss} = 0.7 * CE + 0.3 * \text{Dice} \quad (9)$$

wherein $CE(y, p) = \sum_{i,j} \sum_{k=1}^{C} y_{i,j}^{(k)} \log p_{ij}^{(k)}$; Dice $(y, p) = 1 - \frac{2|y \cap p|}{|y| + |p|}$;

y is a real seismic facies label of a seismic image; p is a predicted mask of the seismic image; $y_{i,j}$ represents a one-hot coding label corresponding to a pixel at i,j of the seismic image; and $p_{ij}^{(k)}$ indicates a probability that the pixel at the i,j of the seismic image is predicted to be a $k^{th}$-type seismic facies.

In an embodiment, when training the seismic facies identification model, parameters of the seismic facies identification model are subjected to iterative updating and learning by using a batch stochastic gradient descent (SGD) algorithm; and after training the seismic facies identification model, the size of the seismic section image is adjusted to a multiple of 16 to be input into the trained seismic facies identification model to predict a type of the seismic facies.

In an embodiment, the iterative updating and learning of the parameters of the seismic facies identification model is performed through steps of:

calculating a gradient of the hybrid loss function, and updating the parameters of the seismic facies identification model along a negative direction of the gradient to achieve a continuous descent of the hybrid loss function.

Compared to the prior art, this application has the following beneficial effects.

Regarding the automatic seismic facies identification method provided herein, the self-attention mechanism and the U-shape architecture are combined, and the Hypercolumn is adopted for automatic seismic facies segmentation and recognition. Moreover, a hybrid loss function is introduced to make the model more concerned with the continuity of segmentation. Compared with the existing U-shape network and Segformer models, the seismic facies identification network model provided by this application not only allows a lower calculation amount, but also reaches a higher seismic facies identification accuracy. Furthermore, based on the accurate seismic facies identification results, the location and structure of the underground sedimentary environment can be predicted more effectively, thereby providing favorable technical support and reference for the oil-gas exploration.

DETAILED DESCRIPTION OF EMBODIMENTS

Figure 1:
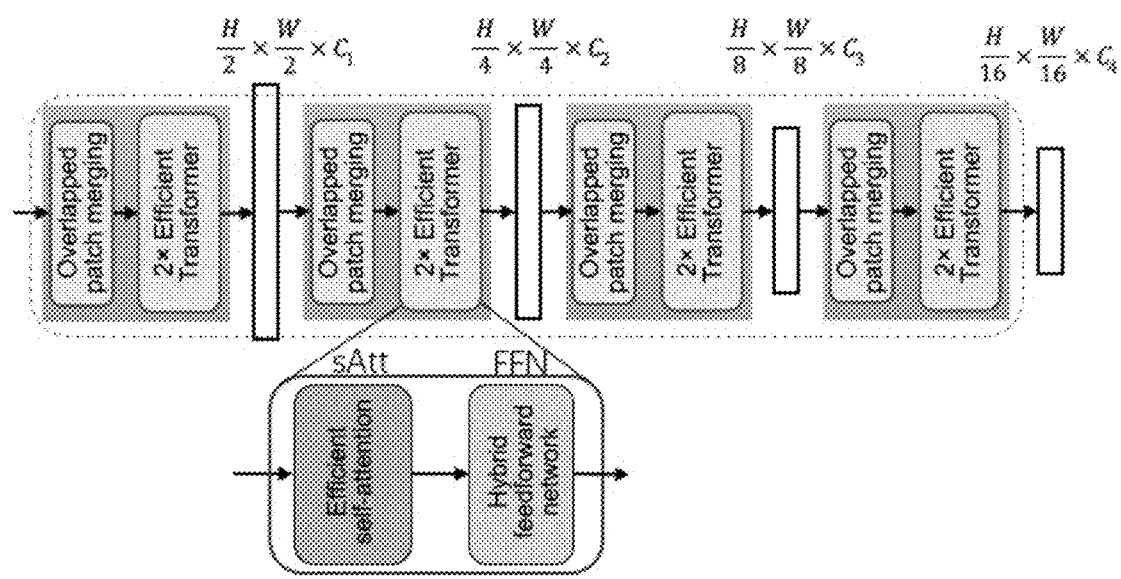
FIG. 1 structurally shows an encoder according to one embodiment of the present disclosure.

The disclosure will be further described in detail below in conjunction with the embodiments and FIGS. 1-6.

The seismic interpretation of post-stack seismic data can be used as semantic segmentation of a seismic image to divide the seismic image into different areas, thereby reflecting the underground sedimentary environments at different locations, so as to be applicable to the location of oil and gas reservoirs. However, it is difficult to arrive at satisfactory seismic facies classification results by directly using the image segmentation methods since these methods do not involve the correlation modeling between pixels of the seismic image and are less effective in depicting the boundary details of some seismic facies types. Therefore, the attention deep neural network model is used to learn the regional association and continuity of seismic images, so as to describe the boundary details of the seismic facies more accurately. The present disclosure provides an automatic seismic facies identification method based on combination of Self-Attention mechanism and U-shape network architecture for predicting the seismic facies corresponding to seismic data, so as to perform seismic interpretation.

This application provides an automatic seismic facies identification method based on combination of Self-Attention mechanism and U-shape network architecture, which includes the following steps.

(a) Post-stack seismic data is obtained and preprocessed to construct a sample training and validation dataset.

(b) An encoder is constructed by using an overlapped patch merging module with a down-sampling function and a self-attention transformer module capable of performing global modeling.

(c) A decoder is constructed by using a patch expanding module with a linear up-sampling function, the self-attention transformer module, and a skip connection module capable of performing multi-scale feature fusion.

(d) A seismic facies identification model is constructed by using the encoder, the decoder, and a Hypercolumn module. The seismic facies identification model includes a Hypercolumns-U-Segformer (HUSeg).

(e) A hybrid loss function is constructed. The seismic facies identification model is iteratively trained with training and validation set in the sample training and validation dataset. Test data is input into a trained seismic facies identification model to obtain seismic facies corresponding to the test data.

In this embodiment, a collection equipment collects seismic waves to obtain the original seismic data. The original seismic data can be superimposed to form a post-stack seismic data $V \in \mathbb{R}^{I \times C \times D}$. In seismic exploration, for facilitating observation and analysis, the post-stack seismic data will be processed to improve the resolution of the post-stack seismic data. The original seismic data is a type of seismic data received by a source excitation.

In this embodiment, the self-attention transformer module is a semantic segmentation network.

In this embodiment, the step of "obtaining and preprocessing post-stack seismic data to construct a sample training and validation dataset" includes the following steps.

Original seismic data is collected and preprocessed to obtain the post-stack seismic data, which is recorded as $V \in \mathbb{R}^{I \times C \times D}$, where I,C,D represents the number of Inline, the number of Crossline, and the number of sampling points within a certain period, respectively. The amplitude of the post-stack seismic data is normalized to [0, 1]. The post-stack seismic data is equally divided into ten section blocks along the crossline direction. The first 70% of the sub-blocks of each of the ten section blocks in the crossline direction are configured as a training set, and the last 30% of the sub-blocks are configured as a validation set. The size of the seismic section image inside each sub-block is adjusted, and the height and width (H, W) of the seismic section image are transformed to a multiple of 16 by using the linear interpolation method, that is, the resolution is transformed into $$\left(16 \cdot \left\lfloor \frac{H}{16} \right\rfloor, 16 \cdot \left\lfloor \frac{W}{16} \right\rfloor\right).$$

Finally, the seismic section image obtained after right-and-left flipping and Gaussian noise transformation is used as the input sample dataset of the model.

In this embodiment, the step of "building an encoder by using an overlapped patch merging module and a self-attention transformer module" includes the following steps.

For a seismic section image $x \in \mathbb{R}^{H \times W}$ with an input height of H and an input width of W, an encoder composite function $f_e = f_e^4 \circ f_e^3 \circ f_e^2 \circ f_e^1$ is built to satisfy $$f_e(x) \in \mathbb{R}^{\frac{H}{16} \times \frac{W}{16} \times C_4}.$$

For the feature map $$x^{(i-1)} \in \mathbb{R}^{\frac{H}{2^{i-1}} \times \frac{W}{2^{i-1}} \times C_{i-1}},$$

a first subfunction $$f_e^i(x^{(i-1)}) \in \mathbb{R}^{\frac{H}{2^i} \times \frac{W}{2^i} \times C_i}$$

is built. $C_i$ is the number of channels of a feature map output by an i-th subfunction of the encoder. As shown in FIG. 1, the first subfunction $f_e^i$ consists of the overlapped patch merging module and the self-attention transformer module, wherein the number of the overlapped patch merging module is one, and the number of the self-attention transformer module is two, called subcode blocks. Each of the subcode blocks can halve the spatial dimension of the input feature map. The number of the first subfunctions $f_e^i$ is four. The four first subfunctions $f_e^i$ constitute four consecutive stages of the encoder. The four feature maps of different scales can be obtained to provide different abstract level features.

In each of subcode blocks, the overlapped patch merging module performs matrix multiplication on the input data by means of overlapped sliding windows, thereby realizing the linear embedding of the feature map, which can down-sample 2×the spatial resolution dimension of the input data. The self-attention transformer module contains a self-attention submodule and a feedforward neural network (FNN) submodule to learn global features and fusion features between different positions in the seismic section image. For the input feature map $x^{(i)}$ at the i-th stage, the calculation formula of subcode block is expressed as:

$$x^{(i+1)} = f_e^i(x^{(i)}) = (\text{FFN} \bullet \text{sAtt})^2 \bullet \text{Conv}(x^{(i)}) \quad (10).$$

In the formula (10), • is an operational character of composite function. Conv is the overlapped patch merging module obtained by using convolution operation. sAtt is a calculation function of the self-attention submodule. FFN is a calculation function of the feedforward neural network submodule.

The calculation formulas of the self-attention submodule and the FNN submodule are respectively expressed as:

$$\text{sAtt}(x) = \text{MHSA}(\text{LN}(x)) + x \quad (1); \text{ and}$$

$$\text{FFN}(x) = L_2(\text{cv}(L_1(\text{LN}(x)))) + x \quad (2).$$

In the above formulas, LN is a layer normalization function. MHSA is a multi-head self-attention calculation function. $L_1$ and $L_2$ are two fully-connected layer functions. cv is a convolutional layer function used for position encoding.

In this embodiment, the step of "building a decoder by using a patch expanding module, the self-attention transformer module, and a skip connection module" includes the following steps.

For the multi-stage encoding feature $\{x^{(i)}\}_{i=1}^4$ encoded by the encoder, a decoder function $f_d$ is built to satisfy $f_d(x^{(1)}, x^{(2)}, x^{(3)}, x^{(4)}) \in \mathbb{R}^{H \times W}$. The decoding process is symmetrical with the encoding process, and the decoder function $f_d$ includes four second subfunctions $f_d^i$, and the four second subfunctions $f_d^i$ constitute four stages of the decoder. For an encoding feature map and a decoding feature map $$x^{(i)} \in \mathbb{R}^{\frac{H}{2^i} \times \frac{W}{2^i} \times C_i}$$

and decoding feature map $$d^{(i)} \in \mathbb{R}^{\frac{H}{2^i} \times \frac{W}{2^i} \times C_i},$$

$$d^{(i-1)} = f_d^i(\text{concat}(x^{(i-1)}, d^{(i)})) \in \mathbb{R}^{\frac{H}{2^{i-1}} \times \frac{W}{2^{i-1}} \times C_{i-1}}$$

is obtained. Among them, i={2,3,4}, $d^{(4)} = x^{(4)}$; and concat represents a tensor concatenation operation along a channel dimension. A feature map of a last stage of the decoder is expressed as $d^{(0)} = f_d^1([d^{(1)}]) \in \mathbb{R}^{H \times W \times C}$.

Figure 2:
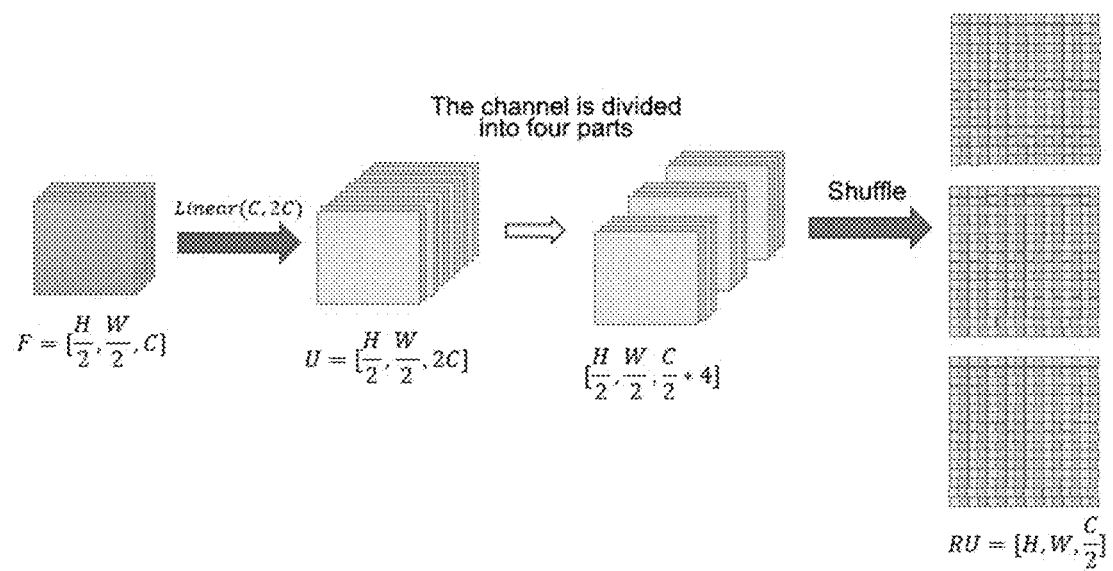
FIG. 2 structurally shows a patch expanding module according to one embodiment of the present disclosure.
Figure 3:
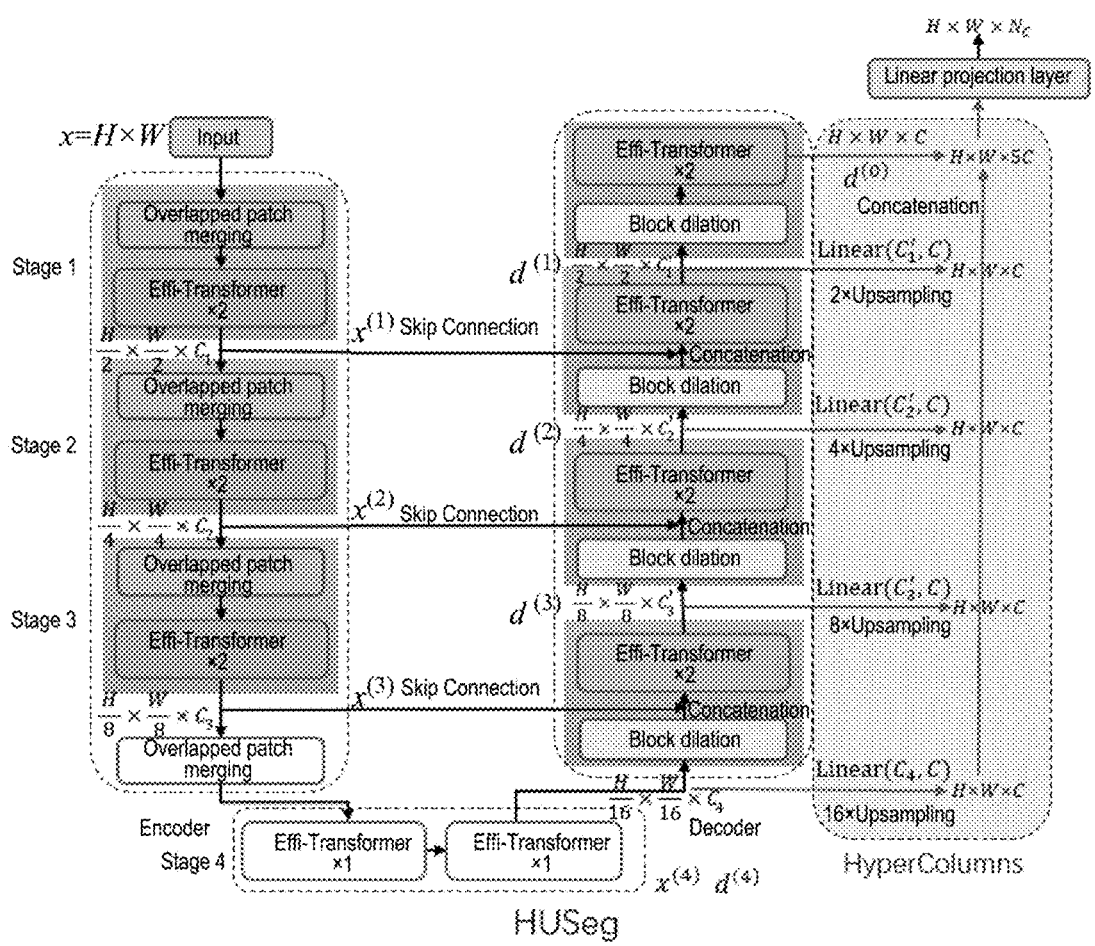
FIG. 3 structurally shows a HUSeg network according to one embodiment of the present disclosure.

Each of the four second subfunctions $f_d^i$ consists of the patch expanding module based on fully-connected layer upsample and two self-attention transformer modules which is called a sub-decoding block. As shown in FIG. 2, the patch expanding module is built to replace the channel dimension with the spatial dimension, and the channel dimension of the data is doubled through the fully-connected layer and then reshaped. The specific operation is to split the channel into four parts, and each two parts are staggered along the spatial dimension, thereby doubling the spatial dimension and halving the channel dimension. Assuming an input feature map is x, a calculation formula of the patch expanding module is expressed as:

$$x = \text{Linear}[C, 2C](x); \text{ and} \quad (3)$$

$$x = \text{Reshape}\left[H*W \times 2C \rightarrow 2H*2W \times \frac{C}{2}\right](x). \quad (4)$$

In above formulas, Linear represents a fully-connected layer, and Reshape represents a dimension reshaping operation.

Stages of the encoder is correspondingly connected to stages of the decoder by the "skip connection" structure to splice the features of the encoder and decoder, so that the decoder receives features of the encoder from corresponding stages of the encoder for fusion, so as to fuse the different semantic features of shallow coarse grain and high-level fine grain.

In this embodiment, the step of "building a seismic facies identification model by using the encoder, the decoder, and a Hypercolumn module" includes the following steps.

A Hypercolumn structure is introduced to fuse output feature maps $\{d^{(i)}\}_{i=0}^{4}$ of the four stages of the decoder to obtain a fused feature map. Pixel-level seismic facies classification is performed on the fused feature map. In this way, features with multiple levels are comprehensively used to classify to improve the effect of intensive prediction tasks. The calculation formulas are expressed as:

$$\hat{d}^{(i)} = \text{Linear}[C_i, C](d^{(i)}) \quad (5);$$

$$\hat{d}^{(i)} = \text{Upsample}[2^i \times](\hat{d}^{(i)}) \quad (6);$$

$$d_f = \text{Linear}[5C, C](\text{Concat}(\hat{d}^{(i)})) \quad (7); \text{ and}$$

$$M = \text{Linear}[C, N_C](d_f) \quad (8).$$

In above formulas, Upsample[$2^i \times$] represents a bilinear interpolation for $2^i \times$ upsampling. Concat(•) represents a concatenation operation along the channel dimension. Linear [$C, N_C$] Is a linear mapping from a dimension C to a dimension $N_C$. $N_C$ is the number of seismic facies types. As show in FIG. 3, the encoder and the decoder together form the U-shape network architecture. The encoder is located at the left side of the U-shape network architecture, and the decoder is located at the right side of the U-shape network architecture. Features of each stage of the decoder are fused by the Hypercolumn structure, and the fully connected layer is used to transform the channel dimension to the number of seismic facies types for seismic facies classification. In this disclosure, the network is named as Hypercolumns-U-Segformer (HUSeg) network.

In this embodiment, step (e) includes the following steps.

The pixel-level cross-entropy loss (CE) is selected as the main optimization goal of model training, and Dice loss is used to assist the model to investigate regional correlation. A calculation formula of the hybrid loss is expressed as:

$$\text{Loss} = 0.7*CE + 0.3*\text{Dice} \quad (9).$$

In the formula (9), $CE(y,p) = \Sigma_{i,j}\Sigma_{k=1}^{C} y_{i,j}^{(k)} \log p_{i,j}^{(k)}$.

$$\text{Dice}(y, p) = 1 - \frac{2|y \cap p|}{|y| + |p|}.$$

y is a real seismic facies label of a seismic image. p is a predicted mask of the seismic image. $y_{i,j}$ represents a one-hot coding label corresponding to a pixel at i,j of the seismic image. $p_{ij}^{(k)}$ indicates a probability that the pixel at the i,j of the seismic image is predicted to be a $k^{th}$-type seismic facies. When training the model, the Adam optimizer with a batch size of 8, an initial learning rate of 1e−3 and a weight decay of 1e−4 is used to train and learn the model.

In this embodiment, regarding the automatic seismic facies identification method, when training the seismic facies identification model, parameters of the seismic facies identification model are subjected to iterative updating and learning by using the batch stochastic gradient descent (SGD) algorithm.

After training the seismic facies identification model, the size of the seismic section image is adjusted to a multiple of 16 to be input into the trained seismic facies identification model to predict a type of the seismic facies.

In this embodiment, the iterative updating and learning of the parameters of the seismic facies identification model is performed through steps of: calculating a gradient of the hybrid loss function; and updating the parameters of the seismic facies identification model along a negative direction of the gradient to achieve a continuous descent of the hybrid loss function.

When the model is trained, for any seismic section, the size of the seismic section image is adjusted to a multiple of 16 by using the linear interpolation method and input into the model for prediction. The size of the output tensor of the model is [H, W, $N_C$]. The largest probability index is taken as the predicted type of the seismic facies in the third dimension. A seismic facies matrix with [H, W] is finally output. The value of each position represents the type of seismic facies of the corresponding position of the input seismic image.

Numerical Simulation

First, a public seismic dataset, which is obtained from Block F3 of North Sea in Netherlands labeled by Alaudah and AlRegib (2016), is used to verify the validity of the present disclosure. The parts of Inline 300-700 and Crossline 300-1000 were selected as the training set, and the rest was selected as the test set. Preprocessing was carried out according to step (b) of the method in description, then trained and tested according to step (e), and the trained model was obtained and evaluated.

Figure 4A:
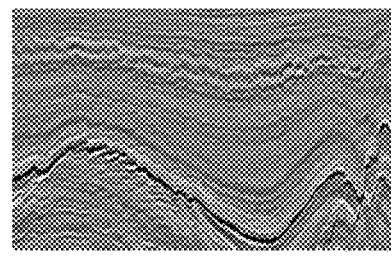
FIGS. 4a-4f show comparison of seismic facies identification results obtained by different semantic segmentation methods; where 4a: a seismic section image; 4b: a seismic facies label diagram corresponding to the seismic section; 4c: seismic facies identification results obtained by SegNet; 4d: seismic facies identification results obtained by UNet; 4e: seismic facies identification results obtained by Segformer; and 4f: seismic facies identification results obtained by HUSeg according to one embodiment of the present disclosure.
Figure 4B:
Figure 4C:
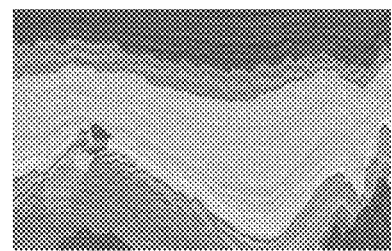
Figure 4D:
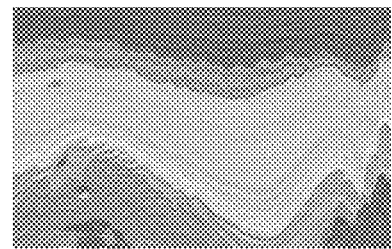
Figure 4E:
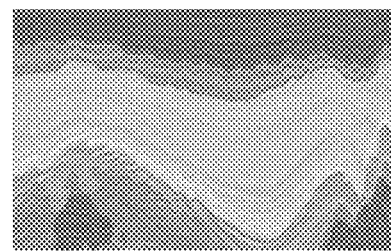
Figure 4F:
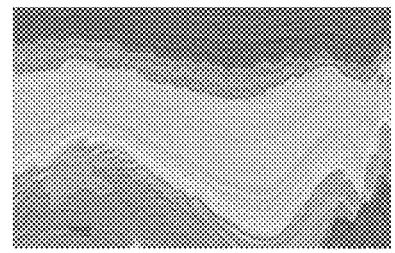

FIGS. 4*a*-4*f* showed the seismic facies segmentation results of the seismic facies identification model on seismic section of the test set on Inline 400. In this embodiment, SegNet, UNet, and Segformer, and HUSeg automatic seismic facies identification method proposed in the present disclosure were compared, respectively. FIGS. 4*a* and 4*b* showed the seismic section image of the test set on inline 400 and the seismic facies label diagram corresponding to the seismic section. FIGS. 4*c*-4*f* showed seismic facies identification results obtained by SegNet, UNet, Segformer and HUSeg models proposed in the present disclosure, respectively. The accuracy of the test set of SegNet was 0.851, the accuracy of the test set of UNet was 0.861, the accuracy of the test set of Segformer was 0.903, and the accuracy of the test set of HUseg proposed in the present disclosure was 0.931. In order to further illustrate the advantages of the network model proposed in the present disclosure, the calculation amount of UNet, Segformer, and HUSeg model was compared. Due to the low accuracy of SegNet model, the calculation amount of the SegNet model was not compared here. When the input sample is an image of 128×128, the calculation amount of UNet, Segformer and HUSeg model was 13.65 (billion), 4.41 (billion) and 4.37 (billion), respectively. Thus, HUSeg network model not only enabled the computer to have lower calculation amount, but also could obtain a higher accuracy of seismic facies identification. SegNet introduced some shallow seismic facies noise in the deep seismic facies region of the seismic image, and introduced a large amount of deep seismic facies noise in the middle seismic facies region. UNet introduced a small amount of adjacent seismic facies noise in shallow seismic facies region and introduced various seismic facies noise in middle seismic facies region. Segformer introduced only a large number of shallow seismic facies in the middle seismic facies region. The HUSeg model proposed in the present disclosure had better results than all models discussed above. Specifically, the HUSeg model not only removed the noise in the middle seismic facies, but also significantly reduced the noise of other seismic facies in the deep seismic facies region, and made the boundary details of the seismic facies smoother and the lateral continuity better.

Figure 5:
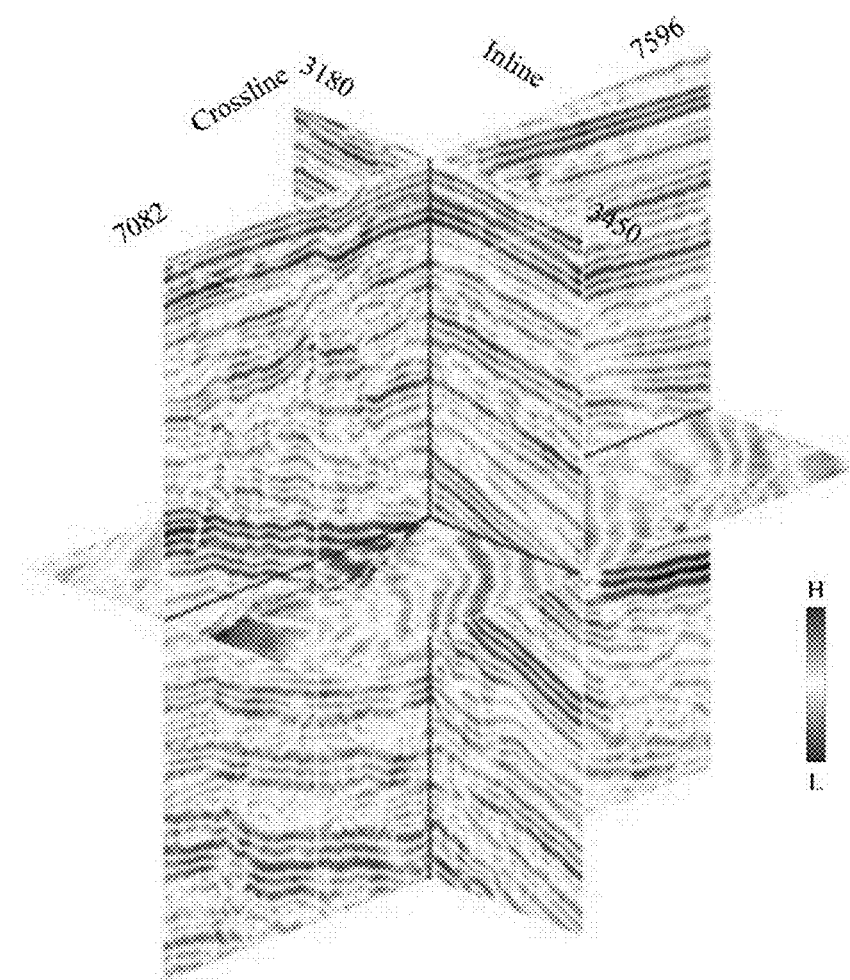
FIG. 5 shows post-stack three-dimensional seismic data of Bohai Bay Basin according to an embodiment of the present disclosure.
Figure 6A:
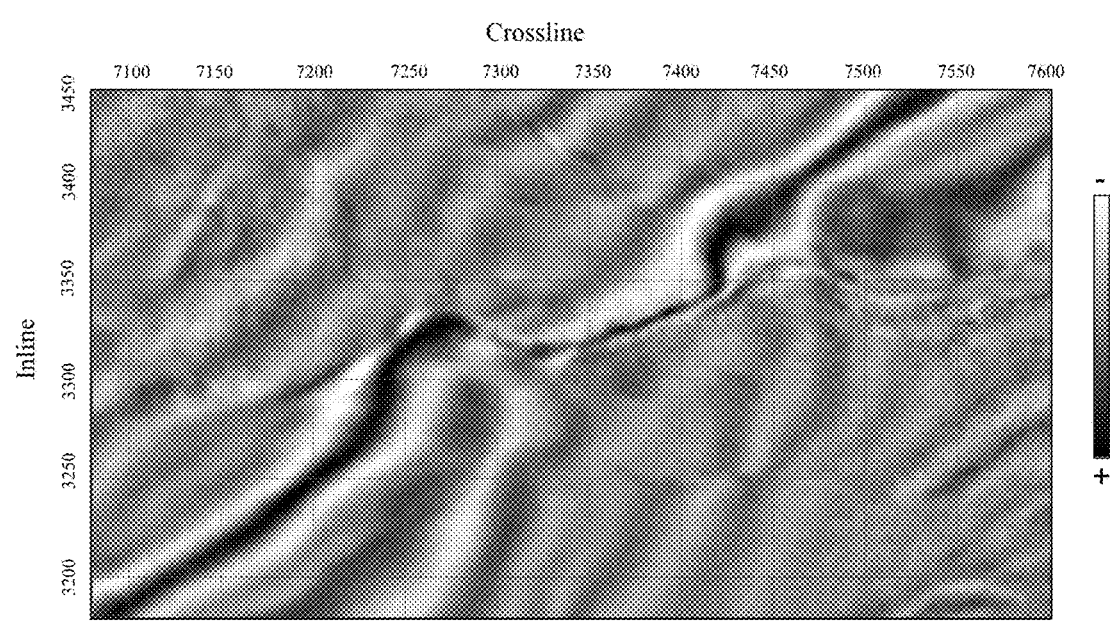
FIG. 6a shows a stratigraphic slice of seismic data.
Figure 6B:
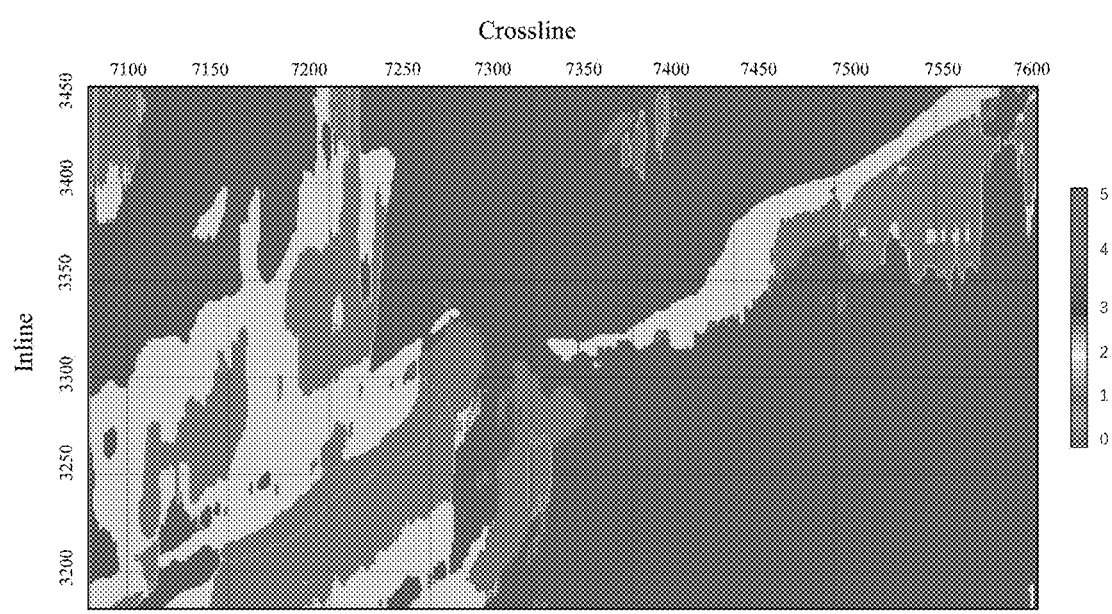
FIG. 6b shows identification results of the seismic data obtained by the method according to an embodiment of the present disclosure.

Finally, a post-stack seismic data obtained from Bohai Bay Basin in China was used to further verify the validity of the disclosure. For the post-stack seismic data with a main frequency of 29 Hz and a frequency band of 6-52 Hz, the HUSeg model was used to identify the seismic facies of all inline sections of the seismic body, and the results were stitched into the seismic facies, and the sedimentary facies were explained by stratigraphic slices. FIG. 5 showed three-dimensional seismic data with Inline 7596 and Crossline 3180. As shown in FIGS. 6*a-b*, the stratigraphic slices and seismic facies identification results can be interpreted as sedimentary microfacies such as delta plains, swamps, diversion channels, natural dikes, underwater inter-channel bays and semi-deep lakes.

What is claimed is:

1. An automatic seismic facies identification method based on combination of Self-Attention mechanism and U-shape network architecture, the method comprising:
   (a) obtaining and preprocessing post-stack seismic data to construct a sample training and validation dataset;
   (b) building an encoder by using an overlapped patch merging module with a down-sampling function and a self-attention transformer module capable of performing global modeling;
   (c) building a decoder by using a patch expanding module with linear up-sampling function, the self-attention transformer module, and a skip connection module capable of performing multi-scale feature fusion;
   (d) building a seismic facies identification model by using the encoder, the decoder, and a Hypercolumn module, wherein the seismic facies identification model comprises a Hypercolumns-U-Segformer (HUSeg); and
   (e) building a hybrid loss function; iteratively training the seismic facies identification model with a training and validation set in the sample training and validation dataset; and inputting test data into a trained seismic facies identification model to obtain seismic facies corresponding to the test data;
   wherein the step of "building an encoder by using an overlapped patch merging module and a self-attention transformer module" comprises:

for a seismic section image $x \in \mathbb{R}^{H \times W}$ with an input height of H and an input width of W, building an encoder composite function $f_e = f_e^4 \circ f_e^3 \circ f_e^2 \circ f_e^1$ to satisfy $$f_e(x) \in \mathbb{R}^{\frac{H}{16} \times \frac{W}{16} \times C_4};$$

and
   for a feature map $$x^{(i-1)} \in \mathbb{R}^{\frac{H}{2^{i-1}} \times \frac{W}{2^{i-1}} \times C_{i-1}},$$

constructing a first subfunction $$f_e^i(x^{(i-1)}) \in \mathbb{R}^{\frac{H}{2^i} \times \frac{W}{2^i} \times C_i};$$

wherein $C_i$ is the number of channels of a feature map output by an i-th subfunction of the encoder; the first subfunction $f_e^i$ consists of the overlapped patch merging module and the self-attention transformer module, wherein the number of the overlapped patch merging module is one, and the number of the self-attention transformer module is two; the number of the first subfunction $f_e^i$ is four; four first subfunctions $f_e^i$ constitute four consecutive stages of the encoder; the overlapped patch merging module is implemented by a convolutional layer with a stride less than a kernel size; the self-attention transformer module comprises a self-attention submodule and a feedforward neural network (FNN) submodule; and calculation formulas of the self-attention submodule and the FNN submodule are respectively expressed as:

$$sAtt(x) = MHSA(LN(x)) + x \quad (1); \text{ and}$$

$$FFN(x) = L_2(cv(L_1(LN(x)))) + x \quad (2);$$

wherein LN is a layer normalization function; MHSA is a multi-head self-attention calculation function; $L_1$ and $L_2$ are two fully-connected layer functions; and cv is a convolutional layer function.

2. The automatic seismic facies identification method of claim 1, wherein the step of obtaining and preprocessing post-stack seismic data to construct a sample training and validation dataset comprises:
   (a1) collecting and preprocessing original seismic data to obtain the post-stack seismic data; and normalizing an amplitude of the post-stack seismic data to [0, 1];
   (a2) equally dividing the post-stack seismic data into N section blocks along a crossline direction, wherein each of the N section blocks consists of a first sub-block and a second sub-block; the first sub-block is configured as a training set, and the second sub-block is configured as a validation set; N is a positive integer greater than 2; and a number of the first sub-block is not less than a number of the second sub-block;
   (a3) adjusting a size of a seismic section image to a multiple of 16 by using a linear interpolation method; and
   (a4) subjecting the seismic section image to data augmentation by right-and-left flipping and Gaussian noise transformation.

3. The automatic seismic facies identification method of claim 1, wherein the step of "building a decoder by using a patch expanding module, the self-attention transformer module, and a skip connection module" comprises:
  building a decoder function $f_d$ to satisfy $f_d(x^{(1)}, x^{(2)}, x^{(3)}, x^{(4)}) \in \mathbb{R}^{H \times W}$; wherein the decoder function $f_d$ comprises four second subfunctions $f_d^i$; the four second subfunctions $f_d^i$ constitute four stages of the decoder; for an encoding feature map $$x^{(i)} \in \mathbb{R}^{\frac{H}{2^i} \times \frac{W}{2^i} \times C_i}$$

and a decoding feature map $$d^{(i)} \in \mathbb{R}^{\frac{H}{2^i} \times \frac{W}{2^i} \times C_i},$$

obtaining $$d^{(i-1)} = f_d^i(concat(x^{(i-1)}, d^{(i)})) \in \mathbb{R}^{\frac{H}{2^{i-1}} \times \frac{W}{2^{i-1}} \times C_{i-1}};$$

wherein i={2,3,4}; $d^{(4)} = x^{(4)}$; concat(·) represents a tensor concatenation operation along a channel dimension; and a feature map of a last stage of the decoder is expressed as $d^{(0)} = f_d^1([d^{(1)}]) \in \mathbb{R}^{H \times W \times C}$;
  each of the four second subfunctions $f_d^i$ consists of the patch expanding module and the self-attention transformer module, wherein the number of the self-attention transformer module is two; when an input feature map is x, a calculation formula of the patch expanding module is expressed as:

$$x = \text{Linear}[C, 2C](x); \text{ and} \quad (3)$$

$$x = \text{Reshape}\left[H * W \times 2C \rightarrow 2H * 2W \times \frac{C}{2}\right](x); \quad (4)$$

wherein Linear represents a fully-connected layer; and Reshape represents a dimension reshaping operation; and
  connecting stages of the encoder correspondingly to stages of the decoder through the skip connection module to enable the decoder to receive features from corresponding stages of the encoder for fusion.

4. The automatic seismic facies identification method of claim 3, wherein the step of "building a seismic facies identification model by using the encoder, the decoder, and a Hypercolumn module" comprises:
  introducing a Hypercolumn structure to fuse output feature maps $\{d^{(i)}\}_{i=0}^4$ of the four stages of the decoder to obtain a fused feature map; and performing pixel-level seismic facies classification on the fused feature map through the following formulas:

$$\hat{d}^{(i)} = \text{Linear}[C_i, C](d^{(i)}) \quad (5);$$

$$\hat{d}^{(i)} = \text{Upsample}[2^i \times](\hat{d}^{(i)}) \quad (6);$$

$$d_f = \text{Linear}[5C, C](\text{Concat}(\hat{d}^{(i)})) \quad (7); \text{ and}$$

$$M = \text{Linear}[C, N_C](d_f) \quad (8);$$

wherein Upsample $[2^i \times]$ represents a bilinear interpolation for $2^i \times$ upsampling; concat(·) represents a concatenation operation along the channel dimension; Linear $[C, N_C]$ is a linear mapping from a dimension C to a dimension $N_C$; $N_C$ is the number of seismic facies types; the encoder and the decoder together form the U-shape network architecture; the encoder is located at one side of the U-shape network architecture, and the decoder is located at the other side of the U-shape network architecture; and features of each stage of the decoder are fused by the Hypercolumn structure, and the fully connected layer is configured to transform the channel dimension to the number of seismic facies types for seismic facies classification.

5. The automatic seismic facies identification method of claim 4, wherein step (e) comprises:
  training the seismic facies identification model by using a hybrid loss of a cross-entropy loss function and Dice Loss, wherein a calculation formula of the hybrid loss is expressed as:

$$\text{Loss} = 0.7 * CE + 0.3 * \text{Dice} \quad (9);$$

wherein $CE(y, p) = \Sigma_{i,j} \Sigma_{k=1}^C y_{i,j}^{(k)} \log p_{ij}^{(k)}$;

$$\text{Dice}(y, p) = 1 - \frac{2|y \cap p|}{|y| + |p|};$$

y is a real seismic facies label of a seismic image; p is a predicted mask of the seismic image; $y_{i,j}$ represents a one-hot coding label corresponding to a pixel at i,j of the seismic) image; and $p_{ij}^{(k)}$ indicates a probability that the pixel at the i,j of the seismic image is predicted to be a $k^{th}$-type seismic facies.

6. The automatic seismic facies identification method of claim 5, wherein when training the seismic facies identification model, parameters of the seismic facies identification model are subjected to iterative updating and learning by using a batch stochastic gradient descent (SGD) algorithm; and
  after training the seismic facies identification model, the size of the seismic section image is adjusted to a multiple of 16 to be input into the trained seismic facies identification model to predict a type of the seismic facies.

7. The automatic seismic facies identification method of claim 6, wherein the iterative updating and learning of the parameters of the seismic facies identification model is performed through steps of:
  calculating a gradient of the hybrid loss function; and
  updating the parameters of the seismic facies identification model along a negative direction of the gradient to achieve a continuous descent of the hybrid loss function.

* * * * *